United States Patent [19]

Taylor

[11] 4,160,557
[45] Jul. 10, 1979

[54] COLLAPSIBLE REFUSE BAG CART

[76] Inventor: Richard E. Taylor, 14487 SE. Johnson Rd., Milwaukie, Oreg. 97222

[21] Appl. No.: 892,167

[22] Filed: Mar. 31, 1978

[51] Int. Cl.² ............................................. B62B 11/00
[52] U.S. Cl. ...................................... 280/652; 248/98
[58] Field of Search .................... 280/652, 654, 47-24; 248/98, 100

[56] References Cited
U.S. PATENT DOCUMENTS

| 2,872,202 | 2/1959 | Tripoli | 280/654 |
| 3,754,771 | 8/1973 | Shagoury | 280/654 |

Primary Examiner—Robert R. Song
Attorney, Agent, or Firm—Chernoff & Vilhauer

[57] ABSTRACT

A portable, collapsible cart for carrying open top flexible refuse bags comprises a medial upright having upper and lower bag supports pivotally mounted respectively to the upper and lower ends thereof. The respective elements which pivotally join the bag supports to the upright are adapted to accommodate the tubular cylindrical elements from which the cart is formed. Pins fit through communicating openings in the aforesaid joinder elements and the respective bag supports to lock the latter elements in their operative positions. Handles located at the upper end of the upright aid in manipulating the cart on wheels which are rotatably attached to the lower bag support.

4 Claims, 4 Drawing Figures

COLLAPSIBLE REFUSE BAG CART

BACKGROUND OF THE INVENTION

This invention relates to a portable cart for refuse bags, and particularly to such a cart which is collapsible for storage.

Collapsible carts for supporting flexible refuse bags with their top open, and then transporting the bags for remote pickup of trash are legion in the prior art. However, many of the prior art carts of this class are of a design which necessitates a lightweight flimsy construction, such as Lindsey et al, U.S. Pat. No. 3,797,847. Others, such as Wilson, U.S. Pat. No. 3,041,026, while being quite rigid, are of a complex design so as to make their initial cost prohibitive for typical home and garden use. Finally, those carts which are both rigid and of simple designs, such as Shagoury, U.S. Pat. No. 3,754,771, do not include provision for locking the bag support members in their operative positions. Therefore, if the cart is tipped or otherwise mishandled the elements might self collapse and thus either damage the refuse bag or partially empty it.

Accordingly, all of the prior art collapsible refuse carts have one or more shortcomings which limit their usefulness, and none has heretofore combined all of the features necessary to overcome all of the aforesaid disadvantages.

SUMMARY OF THE INVENTION

The refuse cart of the present invention comprises paired cylindrical uprights which define its back side, and which have handles extending outwardly from their upper ends. An open centered, generally rectangular lower bag support, formed from cylindrical tubing, has paired upwardly extending end portions which abutt the lower extremities of the uprights, and U-shaped brackets are rigidly joined to the uprights and rotatably joined to these end portions thereby allowing the lower bag support to be rotated upwardly with respect to the uprights. A pin fits through aligned openings in the brackets and the lower bag support end portions, when the latter is in its lowered or operative position, to lock the elements in this position.

An upper bag support, which is shaped similarly to the lower bag support, is located at the upper end of the cart below the handles, and has downwardly extending extremities which are flattened into an oval cross section. The upper bag support is joined to the uprights by paired brackets which have a semicylindrical inner portions configured to tightly fit over the uprights and planar clamping legs which are separated by a distance less than the diameter of the uprights in order to receive the flattened extremities of the upper bag supports. The brackets are rigidly attached to the uprights and are pivotally attached to the upper bag support so as to permit the latter element to be folded downwardly with respect to the former element. Again a pin is configured for communication within aligned openings in the brackets and the extremities of the upper bag support, when the latter is in its raised or operative position, to lock it in that position.

Clamps are removably located at spaced locations around the periphery of the upper bag support to clamp a refuse bag thereto, and a fastener is provided to secure the bag supports in their collapsed positions for convenient storage of the cart when it is not in use.

Accordingly, it is a principal objective of the present invention to provide a collapsible refuse cart which is of both simplified construction and of rigid design.

It is a further object of the present invention to provide such a refuse cart which is lightweight.

It is a further object of the present invention to provide such a refuse cart which can be locked in either its operative or collapsed position.

It is a further object of the present invention to provide such a refuse cart which is of foolproof design for ease of operation.

DETAILED DESCRIPTION OF THE INVENTION

Figure 1:
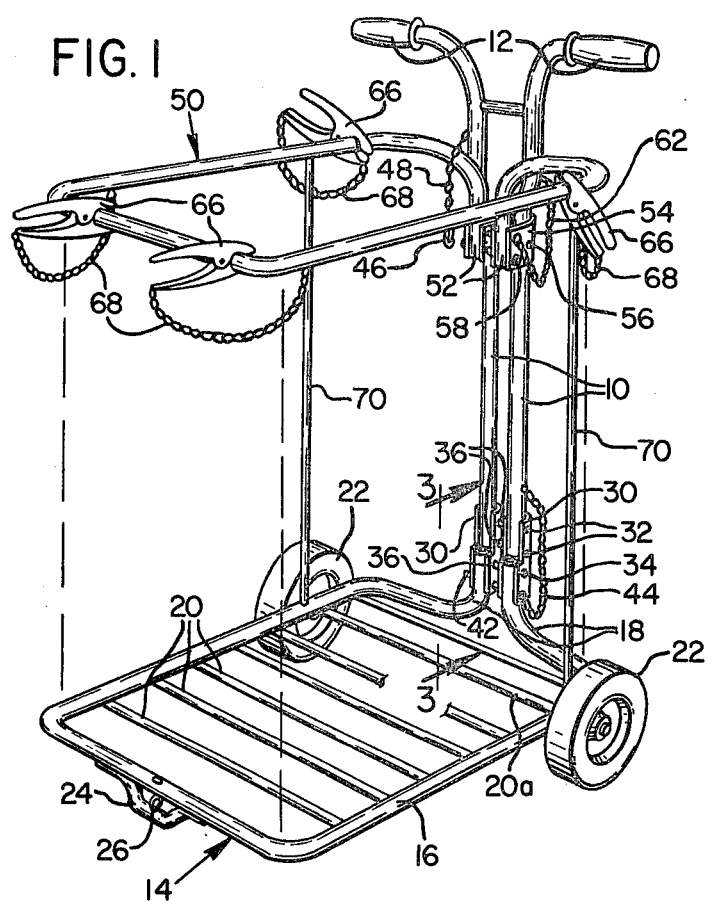
FIG. 1 is a perspective view of a cart of this invention.

Referring to FIG. 1 of the drawings, the cart of the present invention includes paired, parallel, cylindrical uprights 10 which are located medially at the back of the cart. The upper portions of the uprights are bent outwardly at 90° angles to form handles 12 for manipulation of the cart.

The lower extremities of the uprights terminate in lower bag support means 14 which also is cylindrical in cross-section. The lower bag support means includes a center portion 16 which defines an opencentered, generally rectangular frame, and end portions 18, which extend upward normally from the center portion coaxially with lower extremities of uprights 10.

The center portion of lower bag support 14 is spanned by spaced apart support bars 20 which are joined to its respective sides, such as by welding. One of the support bars 20a, located near upright 10, extends outwardly beyond the sides of the lower bag support and serves as an axle to rotatably carry wheels 22. Located on the front end of the lower bag support is a downwardly extending foot 24. In the embodiment illustrated, foot 24 has an open center into which is mounted an eye 26.

Figure 3:
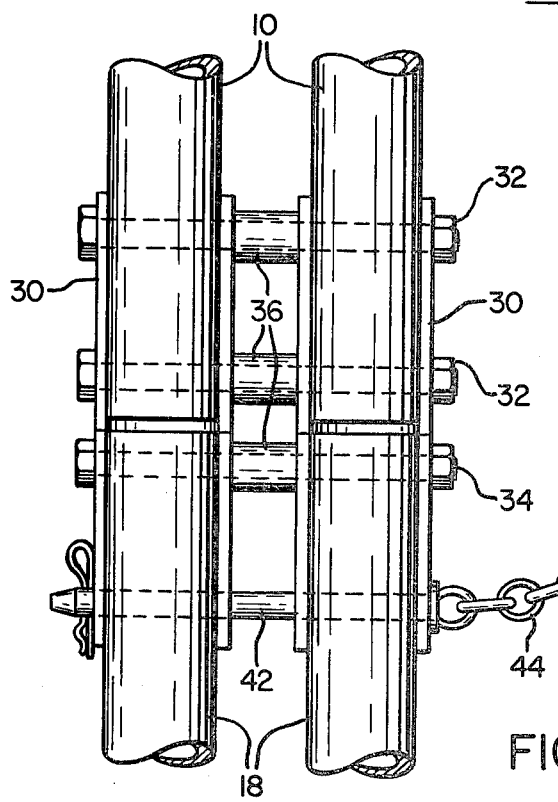
FIG. 3 is a view taken along 3—3 of FIG. 1.

The lower bag support is rotatably joined to the lower extremities of uprights 10 by first connector means, FIG. 3, which comprises paired, U-shaped brackets 30 each of which encircles respective sets of aligned uprights and end portions of the lower bag support means. Brackets 30 are rigidly attached to the uprights by paired fixed fasteners, such as bolts 32, and are rotatably attached to the lower bag support means by a single pivotal fastener, such as bolt 34, having a shoulder on its threaded end to prevent it from clamping the element so that they are not rotatable. All three fasteners extend through both of the respective uprights 10 or end portions 18, and have a spacer 36 located therebetween to maintain the respective spacing of the uprights and end portions.

Figure 2:
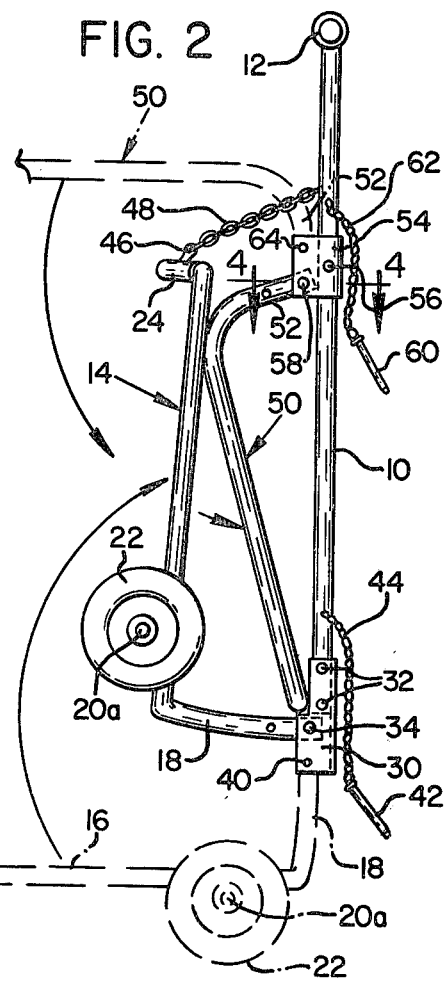
FIG. 2 is a side elevational of FIG. 1 in a folded condition.

Accordingly, the lower bag support is freely pivotal between an operative position, shown in phantom line in FIG. 2, and a collapsed position, shown in solid line in FIG. 2. In order to prevent rotation of the lower bag support means when it is in its operative position, locking means are provided. In the embodiment illustrated the locking means comprises aligned openings 40 in brackets 30 and end portions 18, and a pin 42 adapted to communicate within these openings. The pin is tied to one of the uprights by means of a chain 44 so that it will not become misplaced when it is not in use.

Also a snap clip fastener 46, which is tied to one of the uprights by means of a chain 48, is arranged to engage eye 26 when lower bag support means 14 is in its collapsed position to secure it in this position.

Figure 4:
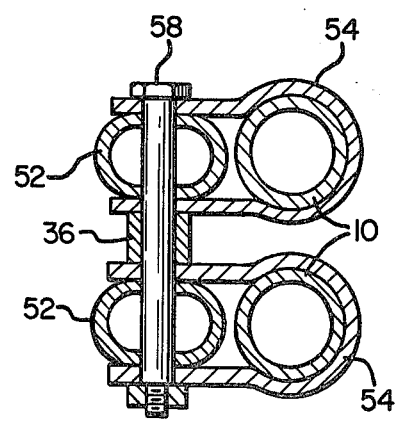
FIG. 4 is a sectional view taken along 4—4 of FIG. 2.

Located at the upper end of the cart, below handles 12, is an open centered upper bag support 50 which has essentially the same shape as the lower bag support, and which also is formed from cylindrical tubing. However, the extremities 52 of the upper bag support are bent downwardly and lie directly in front of uprights 10 rather than being coaxial with them. Also, extremities 52 are flattened into an oval cross section, FIG. 4.

The upper bag support is joined to the uprights by paired brackets 54 each of which has a semicylindrical inner portion 56 configured to tightly fit over uprights 10, and planar clamping legs, which are separated by a distance which is less than the diameter of the uprights in order to receive the flattened extremities 52 of the upper bag support.

Brackets 54 are rigidly attached to uprights 10 by a rigid fastener, such as bolt 56, and are rotatably attached to extremities 52 by a rotatable fastener, such as bolt 58, which has a shoulder on its threaded end to prevent it from being over tightened thus preventing rotation of the elements. Again spacers 36 are carried on bolts 56 and 58 to separate uprights 10 and extremities 52 respectively. Accordingly, the upper bag support also is rotatable between an operative position, as shown by the phantom line in FIG. 2 and a collapsed position, as shown by the solid lines in FIG. 2. A pin 60, which is attached to one of the uprights by means of a chain 62, fits through openings 64 which pass through the the holders and extremities respectively.

A plurality of clamps 66 are located at spaced locations around the periphery of the upper bag support to clamp a flexible plastic refuse bag (not shown) to it. Chains 68 tie the respective clamps to the upper bag support to prevent them from becoming misplaced.

When the cart is in its operative position, spreader bars 70 fit between upper bag support 50 and lower bag support means 14 to prevent downward movement of the former elements relative to the latter. To this end, openings are provided in the respective bag supports to accomodate the spreader bars.

In operation the cart is used in the operative position shown in FIG. 1. With clamps 66 removed from the upper bag support 50, a refuse bag (not shown) is installed in the cart by placing it open end up with its bottom resting on support bars 20 of lower bag support means 14, and its upper lip wrapped around upper bag support 50. The bag is then secured in the cart by placing clamps 66 back on the upper bag support over the bag.

Once the bag is secured in place the cart is transported where desired by tipping it backward with handles 12 so that foot 24 is raised free of the ground, thereby allowing the cart to be transported on wheels 22. Whenever refuse is to be loaded into the cart it is again tipped forward to place foot 24 back on the ground so as to prevent its inadvertant rolling and to stablize it. A full bag is removed simply by removing clamps 66 and extracting the bag upwardly through upper bag support 50.

To store the cart, with the refuse bag removed, pin 60 is removed from opening 64 thereby allowing the upper bag support to be rotated about bolt 58. The upper bag support is then rotated upwardly until spreader bars 70 are free for removal from the cart, and then it is rotated downwardly to its collapsed position adjacent to uprights 10, as shown in FIG. 2.

Thereafter, pin 42 is removed from openings 40 and lower bag support means 14 is rotated upwardly to its collapsed position over upper bag support 14, and fastener 46 is engaged to eye 26 to secure the cart in this orientation where it can be conveniently stored.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A collapsible cart for supporting and transporting flexible refuse bags comprising:
    (a) medial uprights having handles located on their upper extremities, said uprights include spaced apart cylindrical tubes;
    (b) lower bag support means, located at the lower extremity of said uprights, for supporting the bottom of said refuse bag, said lower bag support means includes spaced apart cylindrical end portions which extend upward perpendicularly thereto, on one side thereof, substantially coaxially with said cylindrical tubes;
    (c) first connection means fixedly attached to the lower extremity of said uprights and pivotally attached to said lower bag support means in a manner so that said lower bag support means can be rotated between an operative position substantially normal to said upright support and a collapsed position substantially adjacent to and parallel with said uprights, said first connection means comprising paired, U-shaped brackets arranged to encircle associated ones of said cylindrical tubes and said end portions, fixed fasteners for fixedly attaching said brackets to said cylindrical tubes, and a pivotal fastener pivotally attaching said end portions to said brackets;
    (d) locking means associated with said first connection means for locking said lower bag support means in its operative position;
    (e) an open centered upper bag support located medially on said uprights and arranged for supporting said refuse bag in an open upright orientation when the upper periphery of said refuse bag is attached to said upper bag support;
    (f) means for releasably attaching the upper periphery of said refuse bag to said upper bag support;
    (g) second connection means fixedly attached medially to said uprights and pivotally attached to said upper bag support in a manner so that said upper bag support can be rotated between an operative position substantially normal to said uprights and a collapsed position substantially adjacent to and parallel with said uprights on the same side thereof as said lower bag support means;
    (h) locking means associated with said second connection means for locking said upper bag support in its operative position; and
    (i) wheels rotatably joined to said lower bag support means in a manner to allow transport of said cart thereon when said lower bag support is locked in its operative position.

2. The cart of claim 1 wherein said locking means associated with said first connection means comprises said end portions and said U-shaped brackets having aligned bores passing therethrough, below said pivotal fastener, and a pin, arranged for releasably passing through said bores.

3. The cart of claim 1 wherein said upper bag support includes spaced apart tubular extremities which extend downwardly perpendicularly therefrom, on one side thereof, forwardly adjacent to said cylindrical tubes, and said second connection means comprises: paired U-shaped holders arranged to encircle associated ones of said tubular extremities and said cylindrical tubes; a rigid fastener fixedly attaching said holders to said cylindrical tubes, and a pivotal fastener rotatably attaching said holders to said tubular extremities.

4. The cart of claim 3 wherein said locking means associated with said second connection means comprises said tubular extremities and said holders having aligned passageways passing therethrough, above said rotatable fastener, and a pin arranged for releasably passing through said passageways.

* * * * *